April 11, 1933. C. D. BURNEY 1,903,693
MOTOR ROAD VEHICLE
Filed Aug. 10, 1929  6 Sheets-Sheet 1
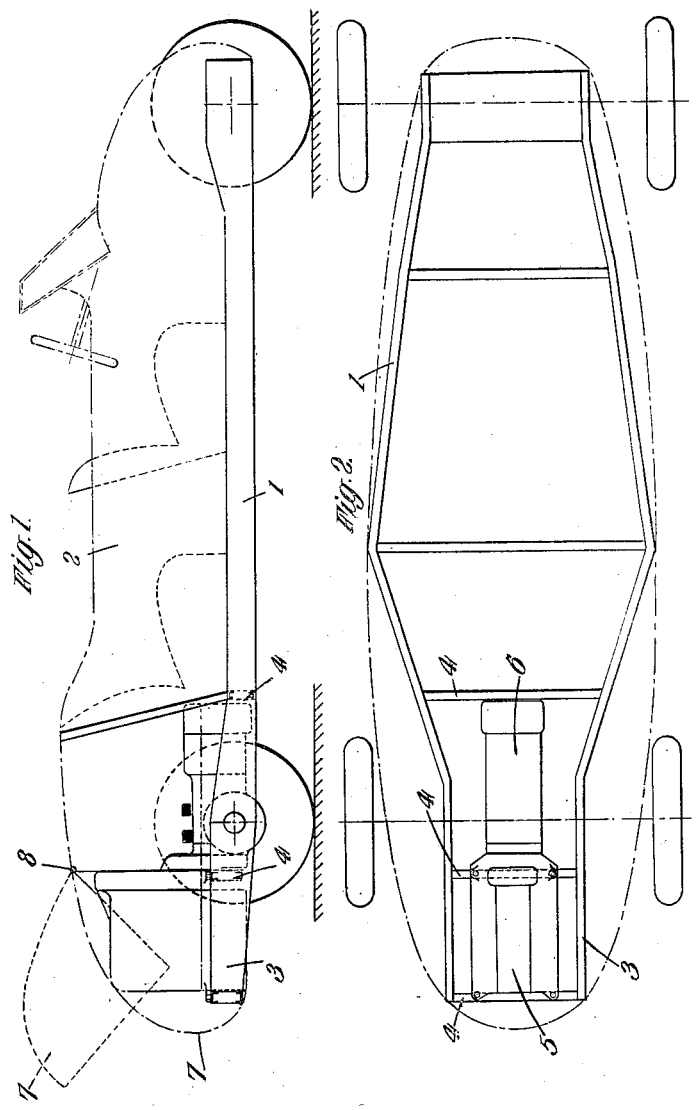

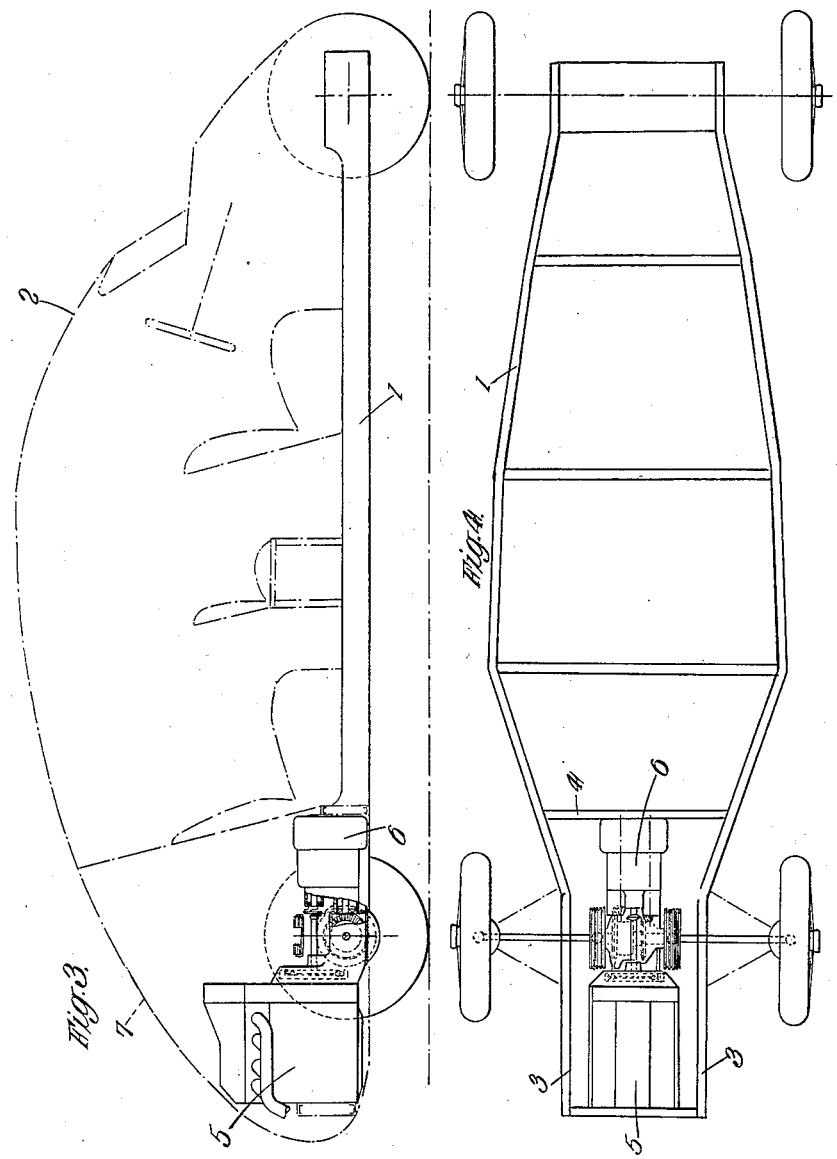

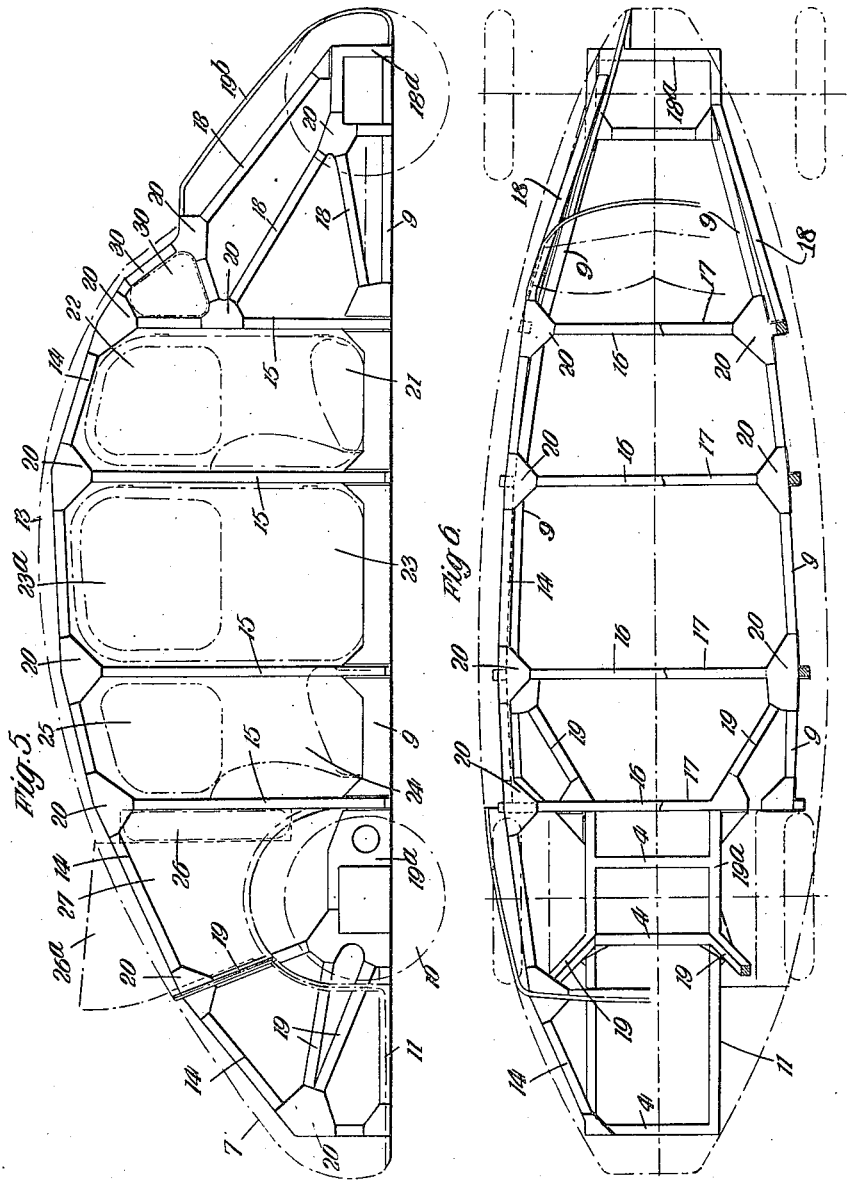

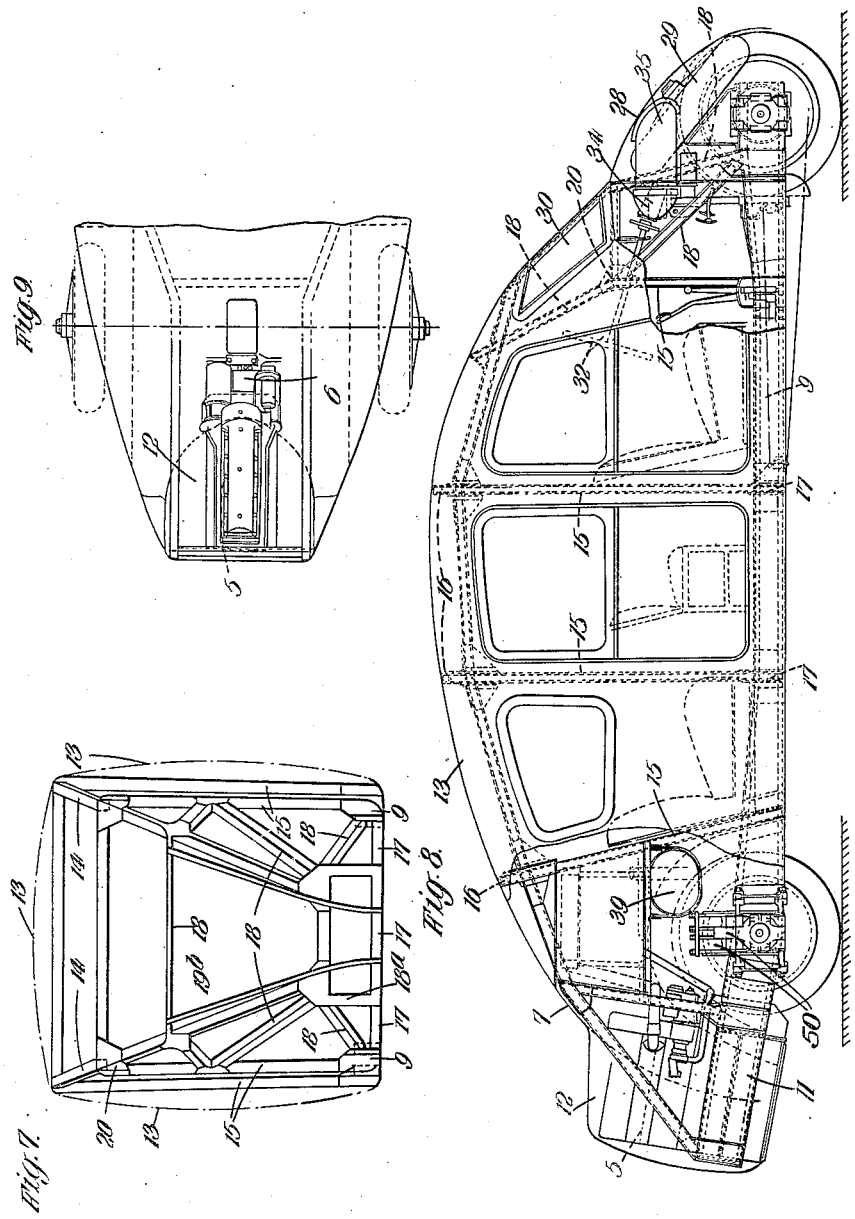

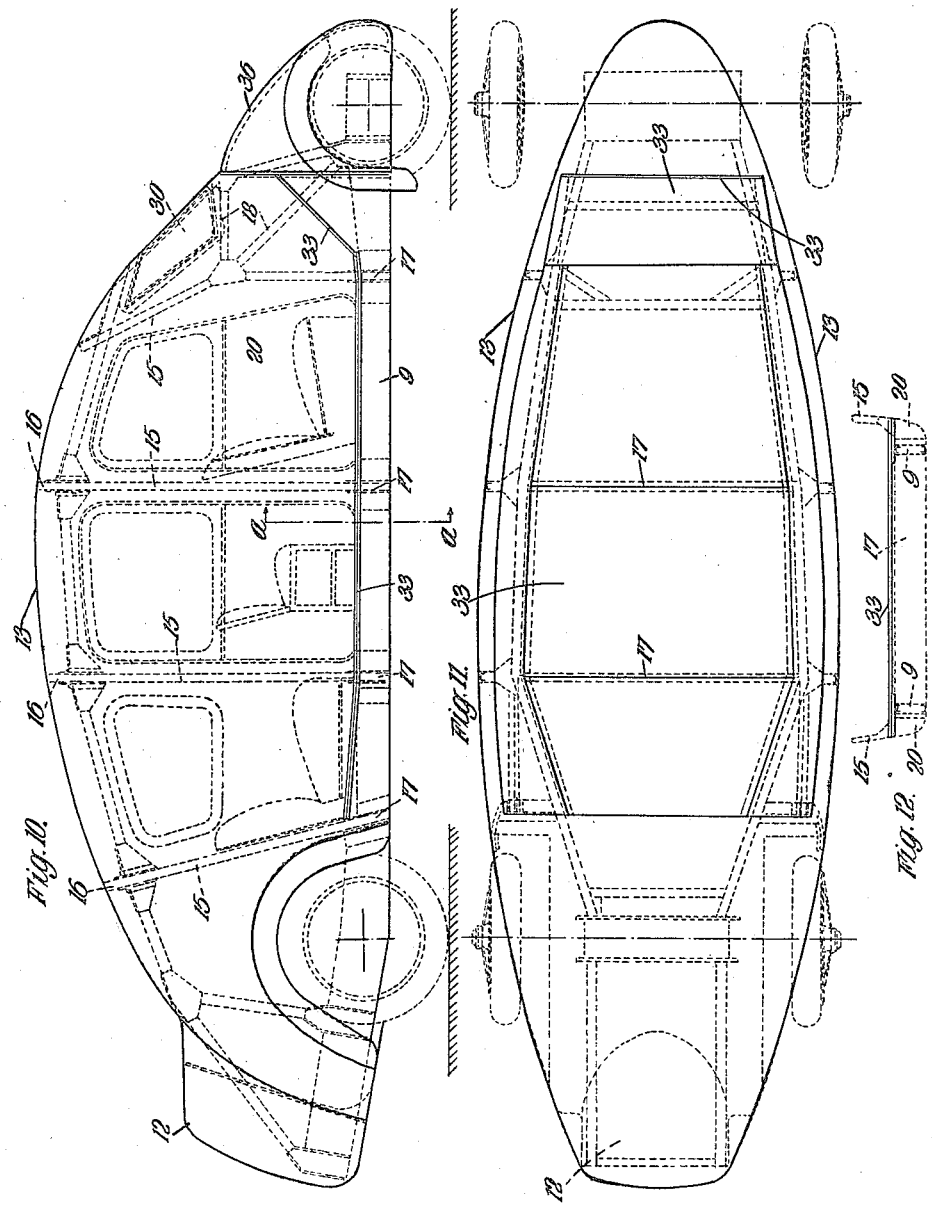

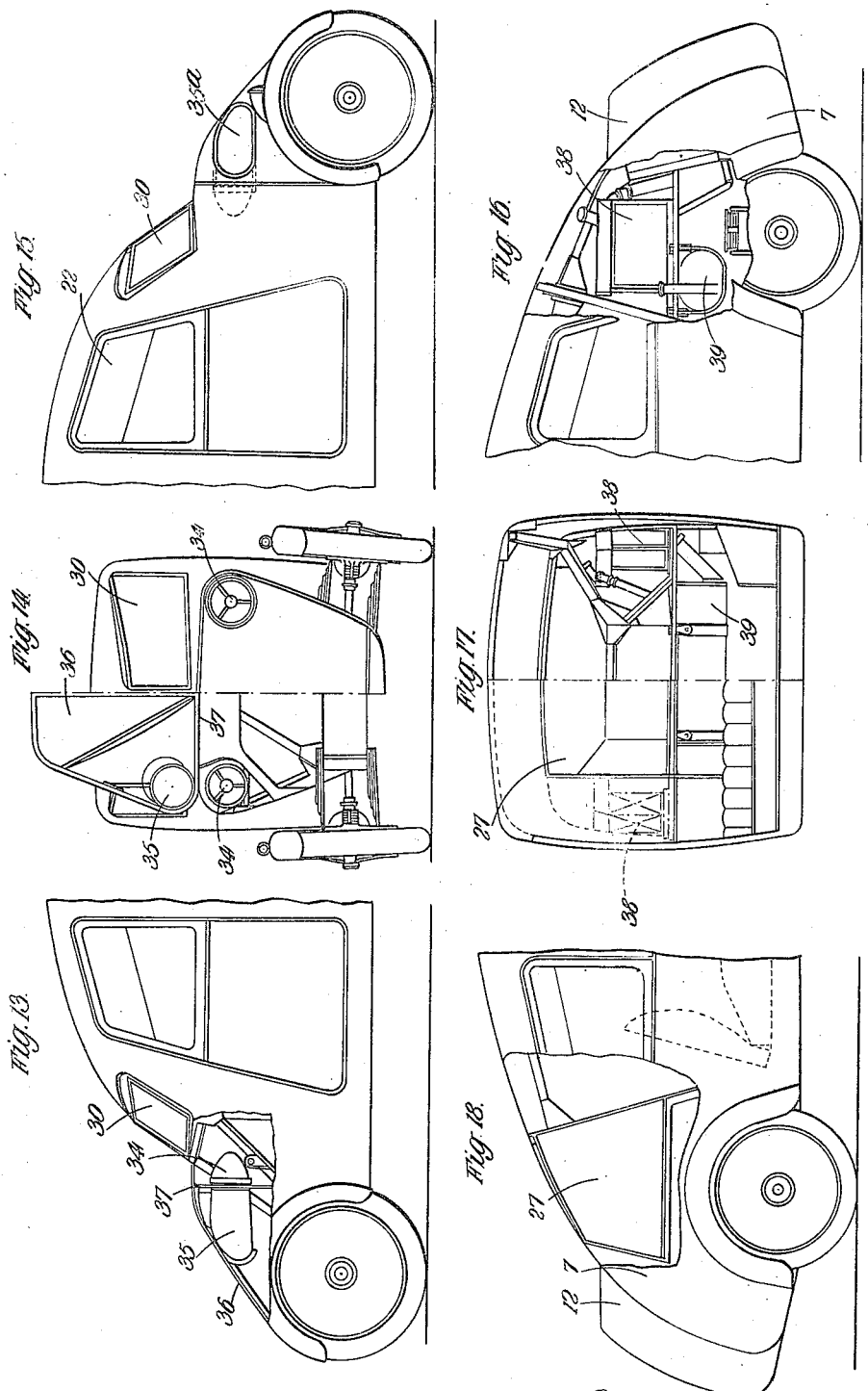

Patented Apr. 11, 1933

1,903,693

UNITED STATES PATENT OFFICE

CHARLES DENNISTON BURNEY, OF WESTMINSTER, ENGLAND

MOTOR ROAD VEHICLE

Application filed August 10, 1929, Serial No. 384,946, and in Great Britain September 6, 1928.

This invention relates to motor road vehicles of the kind in which the engine and gear box are located at the rear of the vehicle in the vicinity of the axis of the rear wheels. In vehicles of this type the engine and the various transmission elements, i. e., clutch, change speed gear and differential, have been formed in a single unit so as to constitute a rigid structure, but in all such previous proposals the engine and gear box have been located in front of the axis of the rear wheels, i. e., between the front and rear wheels. Owing to the engine and gear box being positioned in front of the axis of the rear wheels it has been difficult to obtain access thereto. Such vehicles, however, possess considerable advantages over vehicles of the usual type where the engine is located in the vicinity of the axis of the front wheels, for example, odours and noises arising from the engine are confined to the rear of the car where they do not disturb the passengers, but, mainly owing to the impossibility of inspecting the engine and the various transmission elements in an easy manner, such vehicles have not come into general use.

According to one feature of the present invention all the main protuberances of a motor car of the enclosed or saloon type with the exception of the road wheels are completely enclosed within a framework the shape of which is approximately that of half a torpedo-shaped or similar streamlined body, the curve of the streamline commencing at the front of the car and continuing in a substantially unbroken line along the top and sides to the rear of the car, or alternatively, the top of the car from the front to the rear may be of streamline shape and the sides from a point behind the front of the car to the rear thereof may be flat or substantially flat, the streamlined body portion having an overall ratio of length to maximum diameter of from 3—4½ to 1. The front portion of the car may be approximately 1½—2 diameters long at which distance the maximum diameter occurs. The shape of the front portion should be approximately that of a semi-prolate ellipsoid or spheroid which has been halved along its major axis. The rear portion constitutes part of the top and sides of the car, and should be approximately 2—2½ diameters long measured from the place where it joins the front portion and the top, and also, if desired, the sides may curve or taper inwards from the front portion. It has been found that the adoption of such a streamline shape reduces the resistance of a motor car of the enclosed or saloon type to approximately ⅓ of that of an ordinary enclosed car.

According to a further feature of the present invention and in cases where the saloon or enclosed body portion of a motor car is of streamline form, the track of the front wheels is made wider than the track of the back wheels, as it has been found that with a car of this type an arrangement of this kind is advantageous.

Each wheel of the car may be independently sprung and provided with an independent mud guard. An independent brake may also be provided for each independently sprung wheel. Provision may also be made for effecting steering by means of all four wheels, but in order to avoid certain objections incidental to four wheeled steering, the transmission gearing for actuating the wheels from the steering wheel at the front of the car may be such that the front wheels move through a given angle before any angular movement is imparted to the rear wheels.

According to another feature of the present invention a liquid form of variable speed transmission gearing is provided between the engine and the driven wheels in place of the usual type of gear box, clutch and differentials.

In order that the said invention may be clearly understood and readily carried into effect the same will now be described more fully with reference to the accompanying drawings, in which, Figure 1 is a diagrammatic elevation of a road vehicle of the open or touring type provided with an engine which is located wholly behind the axis of the rear wheels, the gear box being situated in front of the axis of the rear wheels, and Figure 2 is a diagrammatic plan view of Figure 1.

Figures 3 and 4 are views corresponding to Figures 1 and 2 showing the invention applied to a motor car of the enclosed type.

Figure 5 is an elevation, and

Figure 6 is a plan showing the invention applied to a motor car of the enclosed type. The top half of Figure 6 is a plan looking on the top of the frame structure shown at Figure 5, and the bottom of Figure 6 is a half plan of the base members of the frame structure with the top frame structure removed.

Figure 7 is a front view of the frame structure shown at Figure 5 illustrating the first two transverse frames.

Figure 8 is an elevation of a slightly modified form of the frame structure of an enclosed motor car of the type shown at Figures 5, 6 and 7.

Figure 9 is a diagrammatic plan view of the rear portion of the vehicle illustrated at Figure 8 but showing more clearly the position of the engine and gear box relatively to the axis of the rear wheels.

Figure 10 is an elevation, and

Figure 11 is a plan view of Figure 10 showing diagrammatically a streamlined car.

Figure 12 is a section on the line a—a of Figure 11.

Figures 13, 14 and 15 are detail views illustrating a novel arrangement of head lamps enclosed within a cowling at the front of a streamlined car. In Figure 13 the cowling at the nose of the car is broken away to show the tubular passage through which the light from the head lamp is projected. Figure 14, which is a front view of the car, shows on the left hand side the aforesaid cowling in the raised position and on the right hand side the cowling in the normal lowered position. Figure 15 is a side elevation of Figure 14.

Figures 16, 17 and 18 are diagrammatic views of the rear portion of a streamlined car. In Figure 16 part of the bonnet and enclosing coachwork at the rear of the car are broken away to show one arrangement of the radiator and petrol tank relatively to the back axle. Figure 17 is a cross-sectional view showing the position of the radiator, petrol tank and luggage compartment relatively to the back seat of the car, the sections being taken at different points, and Figure 18 is a side elevation with part of the coachwork broken away to show the luggage compartment.

Referring to Figures 1 to 4, 1 is the chassis and 2 the body or tonneau of the car, the body 2 in the case of Figure 3 being of the enclosed or saloon type, wherein all the main protuberances are enclosed in a streamlined outer covering. At the rear end of the car the longitudinal members of the chassis are prolonged at 3, 3, and additional transverse members 4, 4, are shown which provide a support or platform at the rear of the car on which the engine 5 and gear box 6 are mounted. The chassis frame is sprung on the wheels through the intermediary of rear and front springs in the manner most clearly indicated at 50 and 51, Figures 8 and 14. In this embodiment of the invention, the engine 5 is situated wholly behind the back axle and the gear box 6 in front of the back axle and a bonnet or cowling 7 is provided which is pivoted to the body of the car at the point 8, this bonnet 7 being adapted to be raised into the dotted position shown at Figure 1 when it is desired to inspect the engine, clutch, gear box, differential and associated parts. The advantage of this arrangement of the engine and gear box is that it avoids the centre of gravity of the car being positioned too far aft, while at the same time providing good accessibility to the engine and associated parts.

Referring more particularly to Figures 5 to 18 the invention is shown applied to a motor car of the enclosed or saloon type wherein the frame members of the chassis, as also the frame members for supporting the body or coachwork of the car form a unit structure. In each case the framework is, or will be, completely enclosed (as by a covering indicated in broken lines) so as to present a substantially unbroken streamline shape from the front to the rear of the car. To this end the frame members of the combined chassis and upper structure are constituted by lower longitudinal members 9, 9 which take the place of the usual longitudinal members of the chassis of the ordinary type of car, the longitudinal members being extended rearward beyond the axis of the rear wheels 10 to form a platform 11 upon which the engine and gear box are supported. The engine may be positioned behind the back axle and the gear box in front of the back axle as shown in Figures 1 to 4, or the engine, clutch and gear box may be located wholly behind the back axle as shown more clearly at Figures 8 and 9. In the latter case the top frame members assist in distributing the load from the rear to the front of the car. In either case a pivotally mounted hood or cowling 7 is provided which may have an outward protuberance as shown at 12 in Figures 8, 9, 10, 11, 16 and 18, to accommodate the rear part of the engine 5.

Referring more particularly to Figures 5, 6 and 7 upper longitudinal members 14, 14 are provided on each side of the car above the lower longitudinal members 9, 9, which extend from the front to the rear of the car and which are curved to conform to the shape of the top; front and rear portions of the streamlined body portion of the car. The upper members 14, 14 are connected to the lower members 9, 9, on each side of the car by vertical members 15, 15, 15, 15, between which the doors and windows of the car are situated and by upper transverse members 16, 16, 16, 16, and lower transverse members 17, 17, 17, 17, the upper members 16 serving to support the coachwork of the roof and the lower members 17, the floor members of the structure. At the front of the car the supports for the wind screen, front wheels, axles, etc., are constituted by inclined members 18, 18, which also act as supports for the box-like structure 18a, and at the rear of the car the supports for the rear wheels 10, as also the engine, gear box, etc., are constituted by inclined members 19, 19, the latter acting as supports for the box-like structure 19a. The members 9, 14, 15, 18, 18a, 19 and 19a are riveted to gusset plates 20 so as to constitute a rigid structure. It will be observed that the upright and transverse members 15, 15 and 17 constitute ring-like members which are rigidly attached to the upper and lower longitudinal frame members 14, 14 and 9, 9. The longitudinal and transverse members in the example shown are hollow and are square in cross-section. A pair of inclined and curved members 19b are also provided which act as supports for a pivoted cowling provided at the nose of the car.

The driver may occupy a seat located in the space 21 between the two front ring members and doors may be provided on each side of the vehicle at this point, the upper half of each door being provided with a sliding window 22. A central door 23 may be located on each side of the vehicle between the two central ring members, the upper part being constituted by a sliding window 23a. Centrally located seats may be provided at this point. Passengers may occupy seats situated in the space 24 between the two rear frame members, a sliding window 25 being provided on each side of the structure. A bulkhead may be provided in the plane of the rear frame member 15 so as to cut off the passengers and driver from the noise and smell of the engine situated behind the said bulkhead. A space 26 may be provided for accommodating a spare wheel and a luggage compartment 27 may also be provided to which access is obtained through a hinged cover 26a. As shown in Figure 8, the front of the car may be provided with a pivotally mounted cowling or bonnet 28 and the space beneath the said bonnet may be employed for the accommodation of a spare wheel 29. A wind screen 30 is provided supported by the inclined members 18 of the framework at the front of the car.

The steering wheel 32, as also the controls for the clutch, gear box, brakes, etc., are situated at the front of the car as shown more clearly at Figure 8.

The framework of the car is enclosed within an outer covering 13 so as to present a substantially unbroken streamline shape from the front to the rear of the car and in the example shown at Figures 5 to 18 the streamlined car has an overall ratio of length to maximum diameter of approximately 3—4 to 1.

Referring to Figures 10, 11 and 12, 33, 33, are the floor boards of the car which, as shown more clearly at Figure 12, are secured to and form an integral part of the transverse and longitudinal frame members constituting the unit structure. Owing to this arrangement they take their share of twisting moments and shear forces and contribute towards the rigidity and structural strength of the entire framework, while the noise and rattle incidental to floor boards which are loosely fitted as is normally the case are entirely eliminated.

Referring more particularly to Figures 13, 14 and 15, 34, 34, are the head lamps which are situated at the end of a tube or passage 35 formed in a cowling 36 which is pivotally attached to the front of the car at the point 37. The outer end of the tube or passage is glazed or provided with a window directed not only to the front but also to the side 35a of the car as shown more clearly at Figure 15 so that the light from the head lamps 34 is projected, not only forwardly, but also laterally, thus enabling sign posts etc. to be read more easily than heretofore. In order to obtain access to the lamp the cowling 36 can be raised into the position shown on the left hand side of Figure 14, and as previously stated and as shown at Figure 8 the space beneath the cowling 36 may be employed for the accommodation of a spare wheel. As shown more clearly at Figures 16 and 17 the radiators 38 may be positioned on either side of the car and louvres provided in order to direct air currents thereto. The radiators, however, may be situated at some other point of the car. 39 (Figures 16 and 17) shows the position of the petrol tank; 27 being the luggage compartment.

We claim:

1. In a motor road vehicle of the enclosed type, a frame, front and rear pairs of wheels supporting said frame, and an enclosure mounted on said frame and extending forwardly and rearwardly beyond the respective wheel axes, said enclosure having substantially the shape of the upper half of a streamlined body, the front wheels having a relatively wide gauge and being positioned a substantial distance from the sides of the enclosure, and the rear wheels having a relatively narrow gauge and being positioned so that their leading portions are substantially within the plan projection of the enclosure.

2. In a motor road vehicle of the enclosed type, a frame, front and rear pairs of wheels supporting said frame, and an enclosure mounted on said frame and extending forwardly and rearwardly beyond the respective wheel axes, said enclosure having substantially the shape of the upper half of a streamlined body, the front wheels having a relatively wide gauge so that they are positioned a substantial distance from the sides of the enclosure, and the rear wheels having a relatively narrow gauge so that their leading portions are substantially within the plan projection of the enclosure, the leading portions of the front wheels being substantially even with the front end of the enclosure.

3. In a motor road vehicle of the enclosed type having an engine, a frame, front and rear pairs of wheels supporting said frame, the frame being extended rearwardly beyond the axis of the rear wheels and supporting the engine, an enclosure mounted on said frame and extending forwardly and rearwardly beyond the respective wheel axes, the rear portion of said enclosure housing the engine, said enclosure having substantially the shape of the upper half of a streamlined body, the front wheels having a relatively wide gauge and being positioned a substantial distance from the sides of the enclosure, the rear wheels having a relatively narrow gauge and being positioned so that their leading portions are substantially within the plan projection of the enclosure, and passenger or load-receiving accommodations within the enclosure entirely forward of the leading portions of the rear wheels.

4. In a motor road vehicle of the enclosed type, a frame, front and rear pairs of wheels supporting said frame, and an enclosure mounted on said frame and extending forwardly and rearwardly beyond the respective wheel axes, said enclosure having substantially the shape of the upper half of a streamlined body narrowed in the vicinity of the front wheels to space the sides of the enclosure a substantial distance from the front wheels, the distance from the front end of said enclosure to its transverse plane of maximum diameter being approximately 1½ to 2 times said diameter and the portion of said enclosure to the rear of said plane being approximately 2 to 2½ times said diameter, the enclosure having a relatively great width in the vicinity of the rear wheels and the rear wheels being positioned with their leading portions substantially within the plan projection of the enclosure.

5. In a motor road vehicle of the enclosed type having an engine, a frame, front and rear pairs of wheels supporting said frame, the frame being extended rearwardly beyond the axis of the rear wheels and supporting the engine, an enclosure mounted on said frame and extending forwardly and rearwardly beyond the respective wheel axes, the rear portion of said enclosure housing the engine, said enclosure having substantially the shape of the upper half of a streamlined body narrowed in the vicinity of the front wheels to space the sides of the enclosure a substantial distance from the front wheels, the distance from the front end of said enclosure to its transverse plane of maximum diameter being approximately 1½ to 2 times said diameter and the portion of said enclosure to the rear of said plane being approximately 2 to 2½ times said diameter, the enclosure having a relatively great width in the vicinity of the rear wheels and the rear wheels being positioned with their leading portions substantially within the plan projection of the enclosure, and passenger accommodations within the enclosure entirely forward of the leading portions of the rear wheels.

6. In a motor road vehicle of the enclosed type, a frame, front and rear pairs of wheels supporting said frame, and an enclosure mounted on said frame and extending forwardly and rearwardly beyond the respective wheel axes, said enclosure having substantially the shape of the upper half of a stream line body narrowed in the vicinity of the front wheels and the front wheels having a relatively wide gauge so that the said wheels are spaced a substantial distance from the sides of the enclosure, the enclosure having a relatively great width in the vicinity of the rear wheels and the rear wheels having a relatively narrow gauge and being positioned with their leading portions substantially within the plane projection of the enclosure.

7. In a motor road vehicle of the enclosed type having an engine, a frame, front and rear pairs of wheels supporting said frame, the frame being extended rearwardly beyond the axis of the rear wheels for supporting the engine, an enclosure mounted on said frame and extending forwardly and rearwardly beyond the respective wheel axis, the rear portion of said enclosure housing the engine, said enclosure having substantially the shape of the upper half of a stream line body narrowed in the vicinity of the front wheels and the front wheels having a relatively wide gauge so that the said wheels are spaced a substantial distance from the sides of the enclosure, the enclosure having a relatively great width in the vicinity of the rear wheels and the rear wheels having a relatively narrow gauge and being positioned with their leading portions substantially within the plan projection of the enclosure, and passenger accommodations within the enclosure entirely forward of the leading portions of the rear wheels.

In testimony whereof I have affixed my signature.

CHARLES DENNISTON BURNEY.